J. LEMMAN.

Machine for Molding Chair-Backs.

No. 6,312. Reissued March 2, 1875.

Attest

L. M. Hunter

Edgar J. Gross

Inventor

John Lemman

By Y. Milward

Attorney

THE GRAPHIC CO. PHOTO.-LITH. 39 & 41 PARK PLACE, N.Y.

UNITED STATES PATENT OFFICE.

JOHN LEMMAN, OF CINCINNATI, OHIO.

IMPROVEMENT IN MACHINES FOR MOLDING CHAIR-BACKS.

Specification forming part of Letters Patent No. 93,893, dated August 17, 1869; reissue No. 6,312, dated March 2, 1875; application filed July 30, 1874.

*To all whom it may concern:*

Be it known that I, JOHN LEMMAN, of Cincinnati, Hamilton county, State of Ohio, have invented a certain new and useful Improvement in Machines for Molding Chair-Backs, of which the following is a specification:

My invention consists, in the first part, of a cutter-spindle and suitable frame for same, so constructed and journaled in bearings of a swiveling sweep for the purpose of enabling the spindle to be rotated by a single localized pulley, and the axis of the cutter to be across the curved or circular line of chair-backs. or other curved work to be operated upon. My invention further consists, in connection with said swinging radial cutter-spindle frame, of a form and a device to permit the spindle to slide for the purpose of enabling the machine to cut waving forms. My invention further consists, in connection with this sliding and swiveling connection and form, of a spring acting to control the movement of the spindle over the form, so that it is confined to the prescribed path. The fourth part of my invention consists of certain devices for adjusting the position of the form and the work with relation to the axis of the cutter-spindle, by which the machine is adapted to cut varying thicknesses of chair-backs by reason of the vertical adjustment of this form; and it is also adapted to cut at varying angles, owing to the elevation or depression of the cutter-spindle consequent upon the vertical adjustability of the frame which carries the form.

Figure 1:
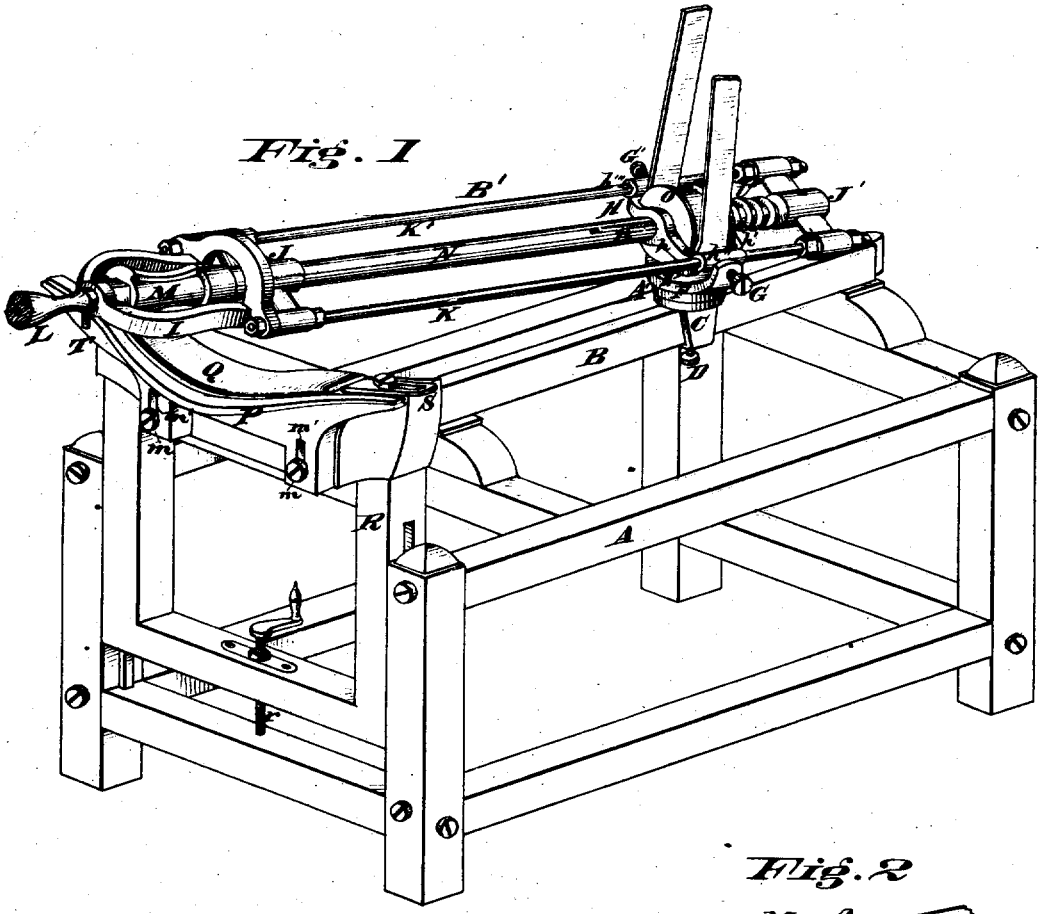
Figure 2:
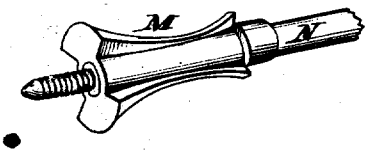
Figure 3:
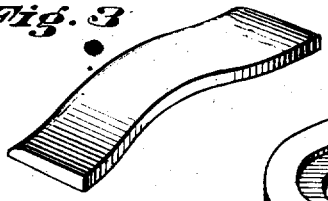
Figure 4:
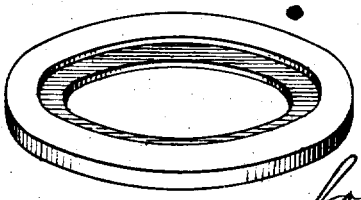

Figure 1 is a perspective view of a machine embodying my invention. Fig. 2 is a view of a cutter specially designed for molding chair-backs. Fig. 3 is a view of a chair-back as completed by the machine. Fig. 4 represents an oval picture-frame, for the molding of which the machine is adapted.

Fig. 1 represents the machine as applied to the molding of chair-backs.

The application of the machine for molding picture-frames will be hereafter explained.

To the frame A a universal joint, A′, is attached, which includes mechanism, first, for enabling the cutter to follow the arc of a circle, consisting of swivel-pin E and jaw F; second, of mechanism for enabling the machine to cut arcs of different radiuses, consisting of socket C, adjustable on the bar B, and tightening-screw D; third, of mechanism by which the cutter is permitted to follow serpertine and other formed patterns varying from the arc of a circle, consisting of a feather on the driving-pulley O, which fits a groove, *n*, on the cutter-spindle; and, fourth, of mechanism for enabling the cutter to follow paths other than horizontal, consisting of swivel-pins G G′ and sockets *h″ h‴*, through which the cutter-frame slides. The cutter-frame B′, which carries the cutter and cutter-spindle, consists of the guard I, which surrounds the cutter-head, cross-heads J J′, and side rods K K′, the guard I being provided with a handle, L, by which the operator manipulates the cutter over the work. In addition to the journals *h h* the cutter-spindle is journaled in the cross-heads J J′ and in the guard I. M is the cutter, and N the spindle, to which it is securely attached. O is the driving-pulley of the cutter. It is located between the bearings *h h′*, and is provided with a feather, which fits the groove *n* in the spindle. The groove and feather device permits the spindle to slide through its driving-pulley, the side rods at the same time sliding through the sockets *h″ h‴*. P is the form or templet, which is so shaped that it will properly govern the cutter M in molding the work. It is adjustable in height by means of screws *m m* and slots *m′ m′*. The work Q, which represents a chair-back, is secured to the sliding frame R by means of clamps S S, this being adjustable in height by means of screw *r*, substantially as shown. A lug or stud, T, projects from the under side of the guard I, which is designed to engage with and follow the curves of the form. It is kept well up against the form, and forcibly compelled to confine itself to the path prescribed for it by means of the spring V, which fits over the cutter-spindle, and between the bearing *h′* and the end of the cutter-frame This device also serves to hold the cutter steady.

The cutter M is constructed substantially in the manner shown in Fig. 2, and is adapted to cut equally well in either direction of rotation. It need not be permitted to cut against the grain of the wood; but by means of the well-known device for reversal used in lathes, &c., the direction of rotation can be at any time reversed in order to cut with the grain. The machine is arranged to cut varying thicknesses of material by vertical adjustment of the form, and the angle at which it is cut can be varied by the elevation or depression of the sliding frame R.

As is evident from the foregoing description, when the swiveling-frame alone is used the form P is not necessary; but when the sliding frame is used in connection therewith the form P or its equivalent will be found useful. The machine is adapted for the manufacture of picture-frames by a proper disposition of the form and work, the frame of the cutter, when required, being capable, when the driving mechanism is specially designed for it, of sweeping an entire circle.

The form used for picture-frames, &c., can be so shaped as to produce a waving molding on the frame.

I claim herein as new and of my invention—

1. A cutter-spindle, N, journaled in bearings of a swiveling sweep, B, substantially as herein shown and described.

2. The sliding and swiveling cutter-frame A′ B′ and cutter-spindle M N, constructed and operating substantially in the manner described, in combination with the form P, for the purpose specified.

3. The coiled spring V, in combination with the projection T of the cutter-frame, when constructed and arranged substantially in the manner and for the purpose specified.

4. The arrangement of the sliding frame R, form P, made adjustable by screws *m m* and slots *m′ m′*, cutter-frame A′ B′, spindle M N, spring V, and projection T, all being constructed and arranged to operate as described.

In testimony of which invention I hereunto set my hand.

JOHN LEMMAN.

Witnesses:
EDGAR J. GROSS,
J. L. WARTMANN.